J. McKeever.
Hoop Skirt.
Nº 71033  Patented Nov. 19, 1867.
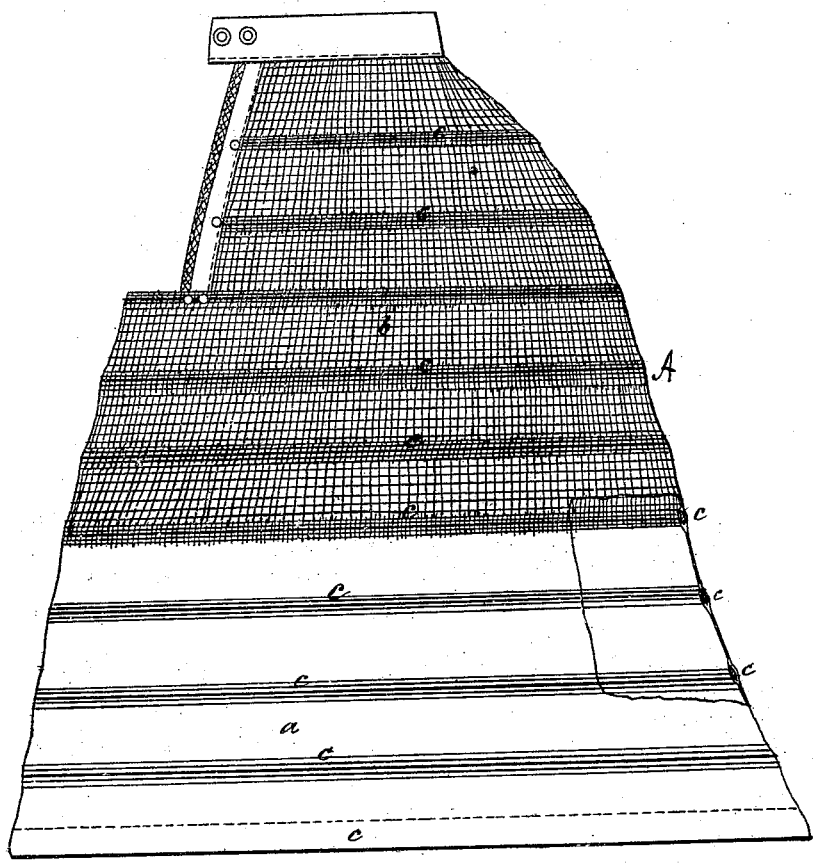
Witnesses.
Geo. F. Southern.
Gustav Berg
Inventor
John McKeever
per
Van Santvoord & Hauff.
Attys.

United States Patent Office.

JOHN McKEEVER, OF NEW YORK, N. Y.

Letters Patent No. 71,033, dated November 19, 1867.

---

IMPROVEMENT IN HOOP-SKIRTS.

---

The Schedule referred to in these Letters Patent and making part of the same.

---

TO ALL WHOM IT MAY CONCERN:

Be it known that I, JOHN McKEEVER, of New York, No. 428 Tenth avenue, in the county and State of New York, have invented a new and useful Improvement in Ladies' Skirts; and I do hereby declare that the following is a full, clear, and exact description thereof, which will enable those skilled in the art to make and use the same, reference being had to the accompanying drawing, forming part of this specification, which drawing represents a perspective view of this invention, partly in section.

This invention consists in a woven skirt, a portion of which is made of single close texture, and another of open gauze net-work, the close texture, as well as the net-work, being provided with pockets made of double close texture, to receive the springs, in such a manner that a neat and elegant skirt is produced, which is light, cool, and convenient to wear, particularly in the hot season.

A represents a skirt, which is made of a woven fabric. This fabric is made partly of a single close texture, as shown at $a$, and partly of an open texture or net-work, as shown at $b$, each part being provided with the required number of pockets $c$, made of double close texture, to receive the wires or springs. The whole fabric is produced in a loom, the single close texture being woven in the ordinary manner, while in weaving the open texture two or more picks are thrown in the same shed. I do not lay any claim, however, to the manner of weaving the fabric, since fabrics with an open texture, similar to mine, are well known.

In making a skirt out of a fabric partially composed of close and partially of open texture, it is desirable that the close texture shall be below, extending up some three or four inches, and that portion between the close texture and the waistband will be made of open texture, as shown in the drawing, though it must be remarked that I do not wish to confine myself to an exact number of inches for either the close or the open texture, and I reserve the right to combine such close and open texture in any manner I may see fit.

By combining the close and open texture with the requisite number of pockets, a skirt is formed which is light, cheap, and very convenient to wear, and which is so arranged that the wires or springs can be easily removed whenever it should be desirable to wash the skirt.

I am aware that a woven skirt, with wires woven in pockets, is not new. I therefore do not claim the same. But what I claim as new, and desire to secure by Letters Patent, is—

A woven skirt, a portion of which is made of single close texture, and a portion of open gauze net-work, the pockets being made of double close texture, as a new article of manufacture.

JOHN McKEEVER.

Witnesses:
   W. HAUFF,
   G. BERG.